(12) United States Patent
Koike

(10) Patent No.: US 6,341,675 B1
(45) Date of Patent: Jan. 29, 2002

(54) TUBE-PRESSED BRAKE

(75) Inventor: Yasuhito Koike, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/406,846

(22) Filed: Sep. 29, 1999

(30) Foreign Application Priority Data

Sep. 29, 1998 (JP) ............................................. 10-275774

(51) Int. Cl.$^7$ ............................ F16D 51/00; B60T 11/00
(52) U.S. Cl. ..................... 188/77 R; 188/366; 192/88 B
(58) Field of Search ................................. 188/365, 366, 188/367, 74, 75, 76, 78, 77 R, 77 W; 192/88 A, 88 B, 88 R, 30 V

(56) References Cited

U.S. PATENT DOCUMENTS

| | | | |
|---|---|---|---|
| 2,952,276 A | * 9/1960 | Warman | 192/88 A |
| 3,450,242 A | * 6/1969 | Heidrich | 188/367 |
| 3,631,943 A | * 1/1972 | Roob | 188/367 |
| 4,411,347 A | * 10/1983 | Bednar | 192/88 B |
| 5,020,649 A | * 6/1991 | Eastcott | 192/88 B |
| 5,086,899 A | 2/1992 | Latsko | |
| 5,178,248 A | * 1/1993 | Latsko | 182/88 B |
| 5,366,055 A | * 11/1994 | Pudelski et al. | 188/366 |

FOREIGN PATENT DOCUMENTS

JP  35-26215  10/1960

\* cited by examiner

*Primary Examiner*—Robert J. Oberleitner
*Assistant Examiner*—Robert A. Siconolfi
(74) *Attorney, Agent, or Firm*—Crowell & Moring LLP

(57) ABSTRACT

A tube-pressed brake has a tube, which is inflatable by injection of a pressure fluid thereinto such that a torque can be transmitted to a counterpart. The tube-pressed brake comprises a pressure fluid circuit for circulating the pressure fluid through an interior of the tube. The tube may be provided with a pressure fluid supply hole and a pressure fluid discharge hole, and the pressure fluid circuit may be provided with a first pressure control device arranged upstream the pressure fluid supply hole and also with a second pressure control valve arranged downstream the pressure fluid discharge hole. The pressure fluid circuit may comprise a main circuit and a pressure control circuit. Through the main circuit, the pressure fluid is allowed to successively flow through a reservoir, a pump, the first pressure control device, the tube, the second pressure control device and the reservoir in this order. The pressure control circuit allows the pressure fluid to flow from a point of the main circuit, the point being located between the pump and the first pressure control device, to the reservoir via a relief valve.

3 Claims, 4 Drawing Sheets

TUBE-PRESSED BRAKE

BACKGROUND OF THE INVENTION a) Field of the Invention

This invention relates to a tube-pressed brake suitable for use in a clutch, a brake or the like.

b) Description of the Related Art

Conventional tube-pressed brakes are each constructed of an outer frame, a tube arranged inside the outer frame, and a counterpart arranged inside the tube and rotatable relative to the tube. A pressure fluid is injected into the tube upon transmission of a torque, and is discharged upon allowing the brake to idle.

FIG. 5 is a cross-sectional view showing a conventional tube-pressed brake as viewed from a front, and FIG. 6 is a diagram illustrating an example of a fluid pressure circuit for the conventional tube-pressed brake. In these drawings, an outer frame 20, a pressure fluid supply hole 21, and a tube 30 are depicted. The tube 30 is folded back along opposite ends of the outer frame 20, between which a cut-off portion 23 is formed. The tube 30 is sealed and fixed at folded portions 31 thereof on the outer frame 20 by presser plates 40 and rivets 41, respectively.

Designated at numeral 32 are springs inserted within the tube 30. These springs 32 urge the tube 30 outwardly such that, during idling with the pressure fluid discharged from the tube 30, the tube 30 is prevented from contacting a brake drum (not shown) arranged inside the tube 30.

As is understood from the circuit diagram of FIG. 6, the pressure fluid is delivered by a pump 52 from a reservoir 53 to the pressure fluid supply hole 21 of the tube 30 via a solenoid-operated valve 60 through a line 50. Numeral 55 indicates a pressure control circuit which includes a relief valve 54. Upon transmission of a torque, the pressure fluid is delivered to the tube 30 via the solenoid-operated valve 60. Upon idling, on the other hand, the solenoid-operated valve 60 is changed over (into the position depicted in FIG. 6) such that the pressure fluid flows in an opposite direction through the line 50 and returns to the reservoir 53.

There is an important demand for providing clutch elements or brake elements with improved heat resistance and durability. A tube-pressed brake of the above-described conventional construction is unable to release heat produced during transmission of a torque, so that a friction surface of a tube and a counterpart, such as a drum, become hot. This leads to the occurrence of a problem in durability and also to the development of an inconvenience that the heat resistance has to be heightened.

SUMMARY OF THE INVENTION

To meet the above-described demand, the present invention provides a tube-pressed brake having a tube, said tube being inflatable by injection of a pressure fluid thereinto such that a torque can be transmitted to a counterpart, comprising a pressure fluid circuit for circulating said pressure fluid through an interior of said tube.

According to the present invention, the pressure fluid is allowed to circulate through the interior of the tube of the tube-pressed brake. This has made it possible to release heat, which is produced during transmission of a torque, to the outside of the brake. As a consequence, it has become possible to improve the durability of the tube and its counterpart, such as a drum, and hence to prolong their service life.

DETAILED DESCRIPTION OF THE INVENTION AND THE PREFERRED EMBODIMENT

Figure 1:
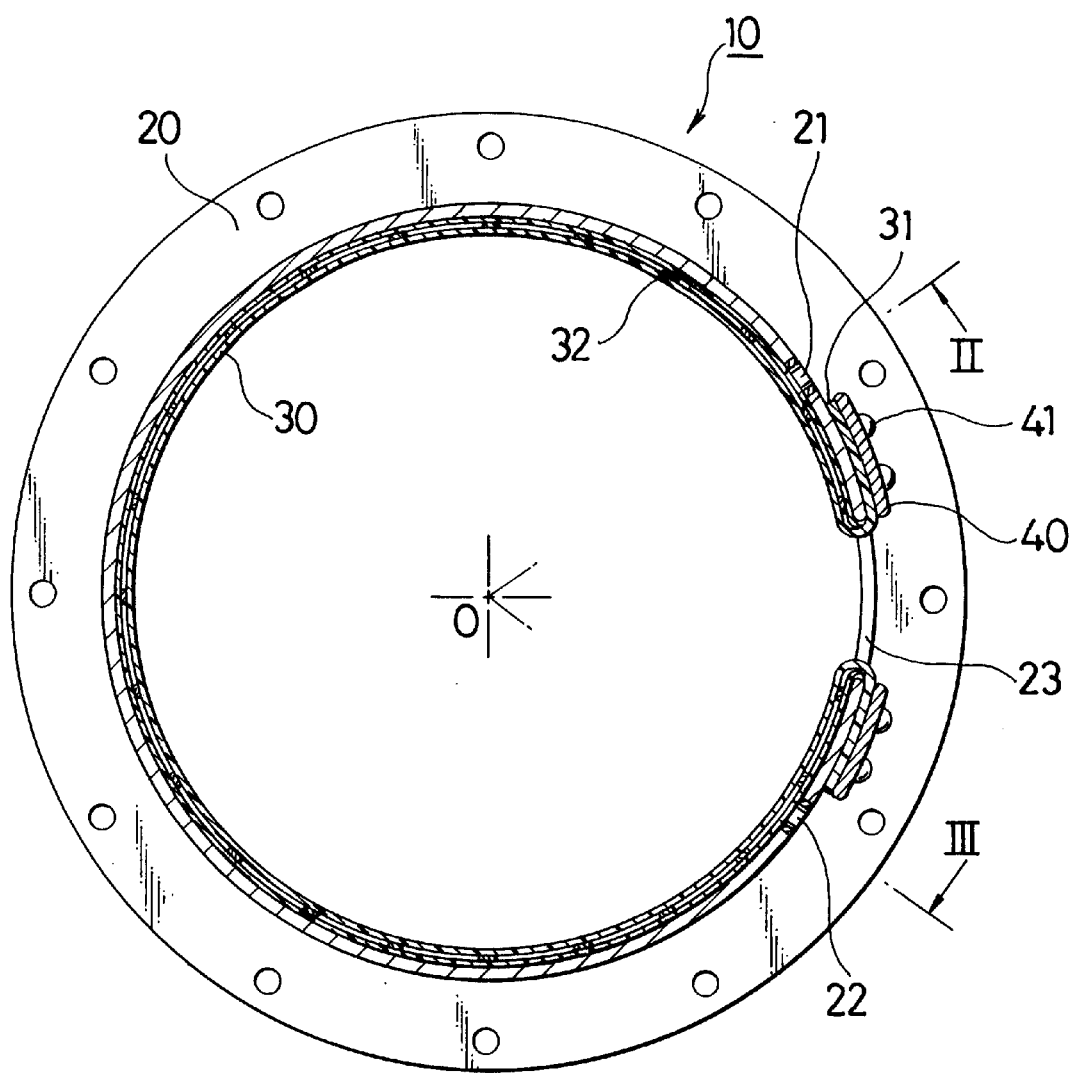
FIG. 1 is a cross-sectional view of a tube-pressed brake according to an embodiment of the present invention as viewed from a front.
Figure 2:
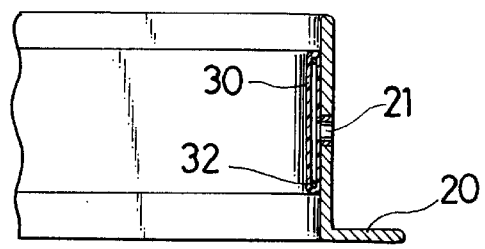
FIG. 2 is a cross-sectional view of the tube-pressed brake taken along line II-O.
Figure 3:
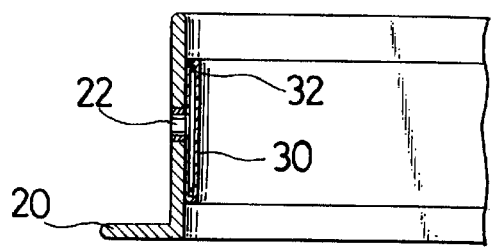
FIG. 3 is a cross-sectional view of the tube-pressed brake taken along line III-O.

With reference to the FIGS. 1 through 4, the tube-pressed brake 10 according to the embodiment of the present invention will hereinafter be described. In these drawings, there are shown an outer frame 20, a pressure fluid supply hole 21, a pressure fluid discharge hole 22, a cut-off portion 23 of the outer frame 20, a tube 30, and folded portions 31 of the tube 30. As is illustrated in FIG. 1, the tube 30 is folded back at the cut-off portion 23 of the outer frame 20, and the tube 30 is fixed at folded portions 31 thereof on the outer frame 20 by presser plates 40 and rivets 41, respectively.

Designated at numeral 32 are springs inserted within the tube 30. These springs 32 urge the tube 30 outwardly such that, when the pressure fluid is discharged from the tube 30 upon allowing the brake to idle, the tube 30 is prevented from slacking inward to avoid a contact between the tube 30 and a counterpart (not shown) such as a drum.

Operation of the tube-pressed brake according to the embodiment of the present invention will next be described with reference to FIG. 4. As a first pressure control device, a solenoid-operated valve 51 is arranged upstream the pressure fluid supply hole 21 of the tube 30. As a second pressure control device, another solenoid-operated valve 56 is also arranged downstream the pressure fluid discharge hole 22.

Figure 4:
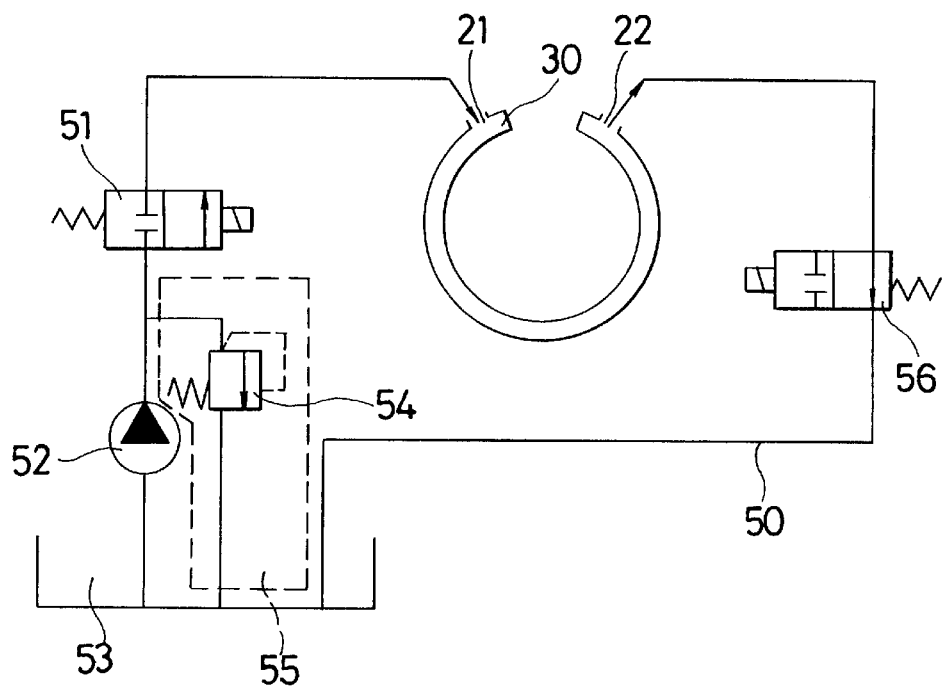
FIG. 4 is a diagram showing a fluid circuit for the tube-pressed brake according to the embodiment of the present invention.
Figure 5:
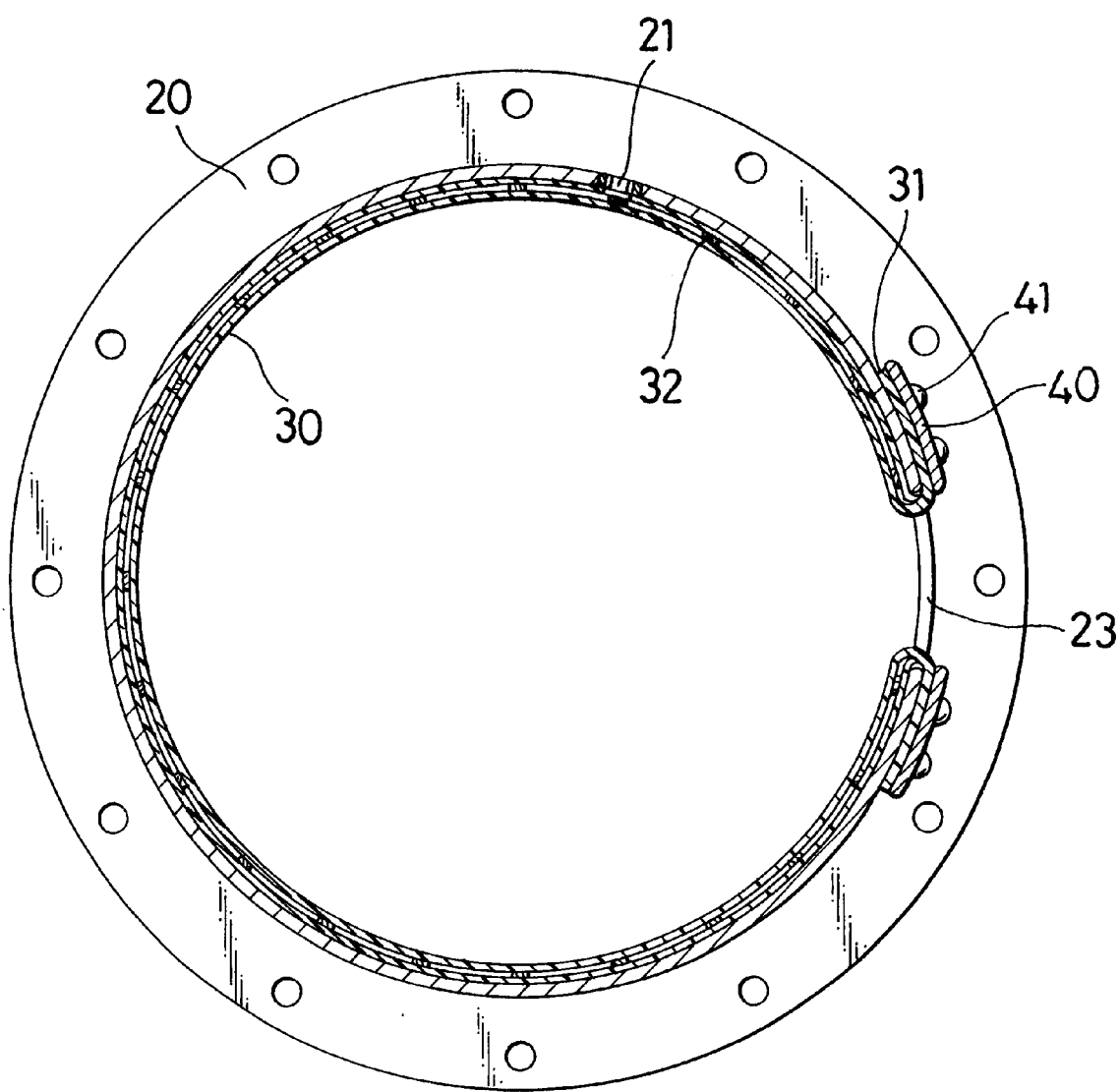
FIG. 5 is a cross-sectional view of a conventional tube-pressed brake as viewed from a front.
Figure 6:
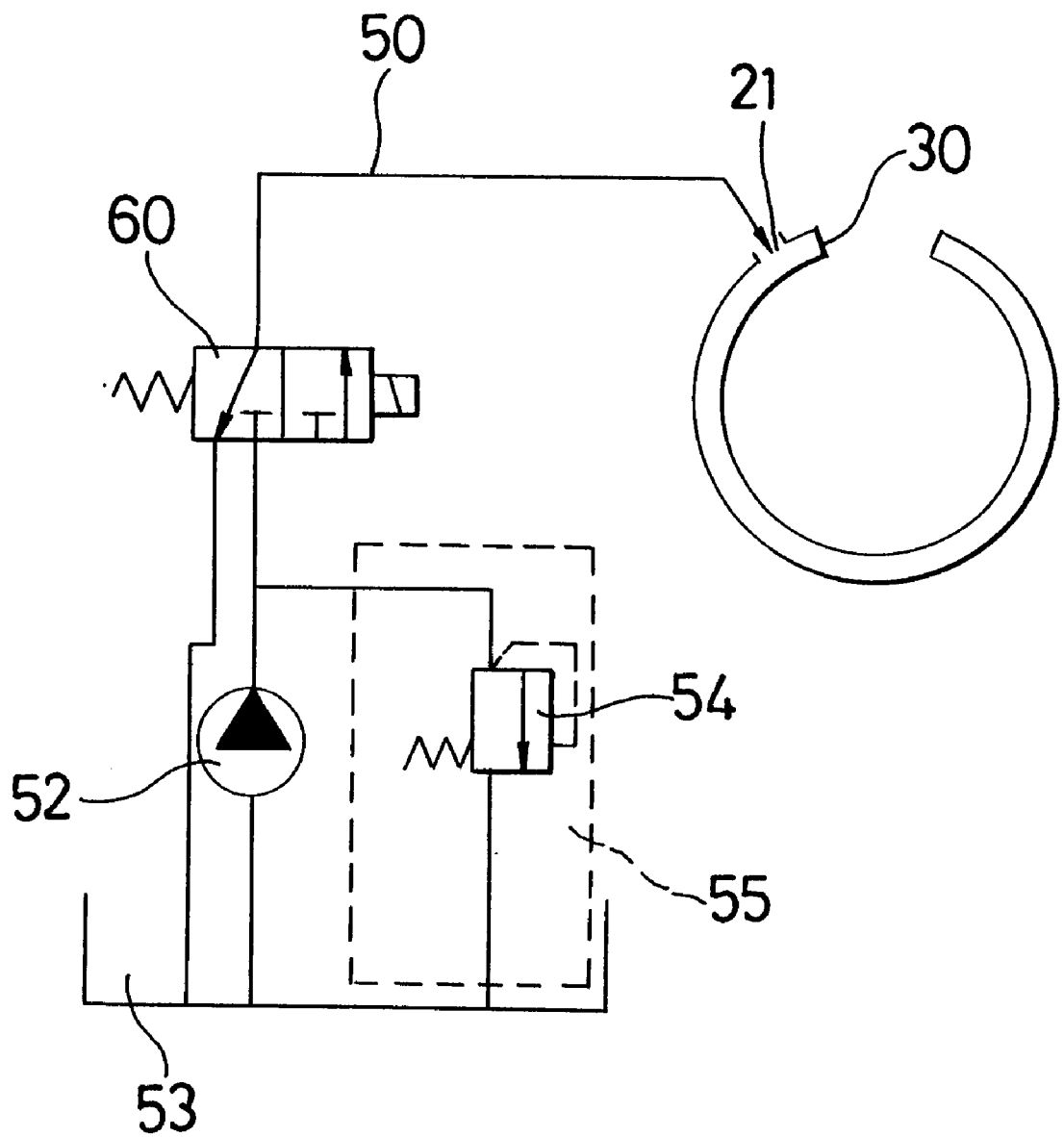
FIG. 6 is a diagram illustrating an example of a fluid circuit for the conventional tube-pressed brake.

FIG. 4 also shows a pump 52, a reservoir 53, a pressure control circuit 55 including a relief valve 54, and a line 50.

A pressure fluid circuit is formed of a main circuit and a pressure control circuit. In the main circuit, the pressure fluid flows from the reservoir 53 to the pressure fluid supply hole 21 by way of the pump 52 and the solenoid-operated valve 51, then enters the tube 30 from the pressure fluid supply hole 21, and subsequent to circulation through an interior of the tube 30, returns from the pressure fluid discharge hole 22 to the reservoir 53 via the solenoid-operated valve 56. In the pressure control circuit, on the other hand, the pressure fluid flows from the reservoir 53 and further through the pump 52, and then returns from a point, which is located between the solenoid-operated valve 51 and the pump 52, to the reservoir 53 via the relief valve 54.

The pump 52 is driven by an engine or the like, whereby the fluid in the reservoir 53 is pumped up and delivered under pressure. The pressure of the pressure fluid so delivered under pressure is controlled to a desired constant pressure by the pressure control circuit 55 which includes the relief valve 54. By appropriately opening the solenoid-operated valve 51 as the first pressure control device, the pressure-controlled pressure fluid is allowed to reach the interior of the tube 30 through the pressure fluid supply hole 21.

By opening the solenoid-operated valve 56 arranged as the second pressure control device downstream the pressure fluid discharged hole 22, the pressure fluid is discharged through the pressure fluid discharge hole 22 and is allowed to return to the reservoir 53 through the line 50. By appropriately opening or closing the solenoid-operated valves 51,56, the pressure fluid inflates the tube 30 such that a binding torque is transmitted to a counterpart such as a drum and at the same time, the pressure fluid is discharged through the pressure fluid discharge hole 22 in an amount equal to an amount of a fresh supply of the pressure fluid required to cool the interior of the tube 30. As a result, the pressure fluid is supplied through the pressure fluid supply hole 21 at the same rate as the discharge rate of the pressure fluid. Accordingly, the pressure fluid is caused to circulate through the tube 30. This makes it possible to release heat, which is produced at the friction surface or the like of the tube 30 as a result of transmission of a torque, to the outside of the brake and to appropriately cool the interior of the tube 30. The durability of the brake can therefore be improved.

To release the brake, the solenoid-operated valve 51 is closed and the solenoid-operated valve 56 is opened. The pressure fluid inside the tube 30 is hence allowed to return from the pressure fluid discharge hole 22 to the reservoir 53 via the solenoid-operated valve 56. As a result, the pressure inside the tube 30 drops, thereby releasing the brake.

The drive means for the pump 52 is not limited to the engine, and a desired drive means such as an electric motor may be used. The first and second pressure control devices may be operated either manually or electrically. These pressure control devices can be of any desired type, such as solenoid-operated valves of the normal closed or normal open type, solenoid-operated 2-port valves, 3-port proportional valves, or control valves actuated by pilot pressures or actuators.

This application claims the priority of Japanese Patent Application No. HEI 10-275774 filed Sep. 29, 1998, which is incorporated herein by reference.

What is claimed is:

1. A tube-pressed brake having a tube, said tube being inflatable by injection of a pressure fuid thereinto such that a torque can be transmitted to a counterpart, comprising a pressure fluid circuit for circulating said pressure fluid through an interior of said tube, wherein said tube is provided with a pressure fluid supply hole and a pressure fluid discharge hole, said pressure fluid entering in through said pressure fluid supply hole and exiting through said pressure fluid discharge hole, and said pressure fluid circuit is provided with a first pressure control valve arranged upstream of said pressure fluid supply hole and a second pressure control valve arrange downstream of said pressure fluid discharge hole.

2. A tube-pressed brake according to claim 1, wherein said pressure fluid can be caused to circulate through said tube at a rate sufficient to cool an interior of said tube.

3. A tube-pressed brake having a tube, said tube being inflatable by injection of a pressure fluid thereinto such that a torque can be transmitted to a counterpart, comprising a pressure fluid circuit for circulating said pressure fluid through an interior of said tube, wherein said pressure fluid circuit comprises:
     a main circuit, through which said pressure fluid is allowed to successively flow through a reservoir, a pump, a first pressure control device, said tube, a second pressure control device and said reservoir in this order; and
     a pressure control circuit for allowing said pressure fluid to flow from a point of said main circuit, said point being located between said pump and said first pressure control device, to said reservoir via a relief valve.

* * * * *